(12) United States Patent
Kalil

(10) Patent No.: US 7,055,451 B2
(45) Date of Patent: Jun. 6, 2006

(54) VESSEL HULL

(76) Inventor: Anthony Kalil, 408 W. University Ave. #9C, Gainesville, FL (US) 32601

( * ) Notice: Subject to any disclaimer, the term of this patent is extended or adjusted under 35 U.S.C. 154(b) by 0 days.

(21) Appl. No.: 10/980,475

(22) Filed: Nov. 3, 2004

(65) Prior Publication Data

US 2005/0087120 A1  Apr. 28, 2005

Related U.S. Application Data

(62) Division of application No. 10/837,340, filed on Apr. 30, 2004.

(60) Provisional application No. 60/468,572, filed on May 6, 2003, provisional application No. 60/467,413, filed on May 2, 2003.

(51) Int. Cl.
*B63B 1/32* (2006.01)
(52) U.S. Cl. ....................... 114/290; 114/271
(58) Field of Classification Search ................ 114/271, 114/280, 282, 284, 285, 290, 291
See application file for complete search history.

(56) References Cited

U.S. PATENT DOCUMENTS

| | | | | | |
|---|---|---|---|---|---|
| 3,602,179 A | * | 8/1971 | Cole | ........................... | 114/290 |
| 4,263,866 A | * | 4/1981 | Shirley | ........................ | 114/271 |
| 4,492,176 A | * | 1/1985 | Arima | .......................... | 114/271 |
| 5,404,830 A | * | 4/1995 | Ligozio | ...................... | 114/282 |
| 5,983,823 A | * | 11/1999 | Allison | ........................ | 114/271 |
| 6,000,357 A | * | 12/1999 | Allison | ........................ | 114/271 |
| 6,629,507 B1 | * | 10/2003 | Biddison | ..................... | 114/271 |
| 6,782,839 B1 | * | 8/2004 | Nozaki | ........................ | 114/282 |

* cited by examiner

*Primary Examiner*—Lars A. Olson
(74) *Attorney, Agent, or Firm*—Saliwanchik, Lloyd & Saliwanchik

(57) ABSTRACT

A vessel hull having a pair of vents formed in the chine on each side for allowing air to be introduced to the bottom and a pair of downwardly extending fins formed longitudinally along the chine adjacent to each vent. Each vent can be formed by a recess in the chine dividing the chine into a forward portion and an aft portion. Each fin is preferably formed longitudinally along the aft portion of the chine and extends below the waterline. The fins counterbalance the removal of a portion of the chine to vent the bottom and increase stability during turns. The hull preferably also includes a pair of chine extensions projecting aft of the transom on each side for reducing or eliminating side-to-side oscillation of the stern when the hull is propelled through the water at slow speeds.

15 Claims, 8 Drawing Sheets

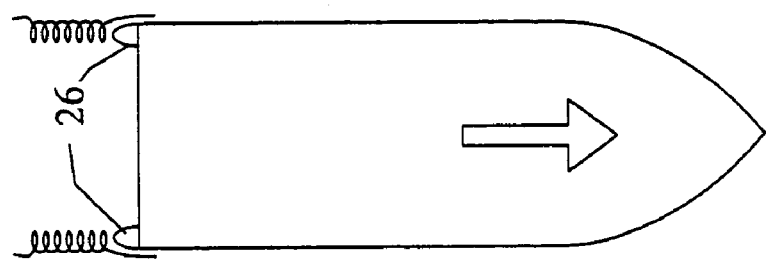
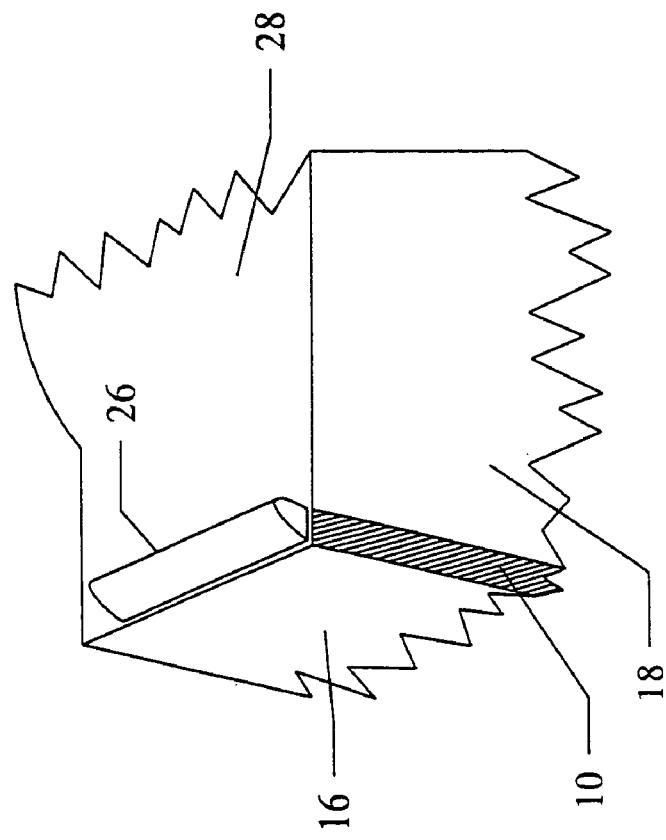
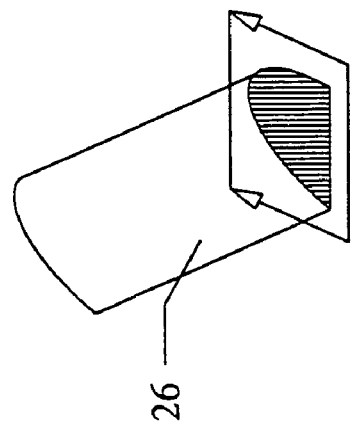
FIG. 7C
FIG. 7A
FIG. 7B

VESSEL HULL

CROSS-REFERENCE TO RELATED APPLICATIONS

This application is a divisional of U.S. application Ser. No. 10/837,340, filed Apr. 30, 2004, which claims the benefit of provisional patent applications U.S. Ser. No. 60/468,572; filed May 6, 2003 and U.S. Ser. No. 60/467,413; filed May 2, 2003, both of which are hereby incorporated by reference in their entirety.

FIELD OF THE INVENTION

This invention relates to the field of vessel hulls. More particularly the invention relates to a hull that includes modifications to chine design resulting in features that improve vessel handling.

BACKGROUND

The chine is the portion of the hull of a flat or V-bottomed boat that forms the intersection between the side and bottom of the hull. The chine may be "hard" (a well defined edge) or "soft" (significant rounding, often merely a gentle curve with no definitive break between bottom and side).

Many power boats have a chine with a step or recess to allow air to be introduced under the hull, often referred to as "vented" chine. Air is introduced under the hull through the vented chine. The introduction of air reduces the wetted area of the hull to lower hydrodynamic drag.

A disadvantage of conventional vented chines is that they can reduce stability during turns, particularly at high speeds. The introduction of air under the hull and resulting decrease in wetted surface area reduces stability. Furthermore, the removal of a portion of the chine to form the vent can further reduce stability during turns by eliminating part of the turning rail. Consequently, high speed turns frequently induce sideways skidding in boats with vented chines. Manufacturers of power boats with vented chines often caution against hard turns at speeds over 40 miles per hour.

Another handling problem commonly encountered when operating power boats is the tendency of the stern to wag from side-to-side at slow speeds. This phenomenon is often called "stern wander". At idle speeds, conventional transoms cause turbulence at the stern as water rushes from the sides into the channel left behind the boat as it travels through the water. This turbulence pulls the stern of the boat resulting in a haphazard oscillation. When traveling at slow speeds, the driver must turn the wheel back and forth to overcome this stern oscillation. Stern wander can create a safety risk because the stern is oscillating out of control (for example, by bringing the prop in contact with people or objects in the water around the stern), or because the driver is distracted as a result of efforts to control the oscillation.

Thus, there is a significant need for an improved vessel hull design that includes features for increasing stability during turns and/or for decreasing stern wander. The modifications to hull design described herein can increase stability during turns and can decrease stern wander as compared to similar hulls without the disclosed modifications.

SUMMARY OF THE INVENTION

A vessel hull in accordance with the invention includes a pair of vents formed in the chine on each side for allowing air to be introduced to the bottom and a pair of downwardly extending fins formed longitudinally along the chine adjacent to each vent. Each vent can be formed by a recess in the chine dividing the chine into a forward portion and an aft portion. Each fin is preferably formed longitudinally along the aft portion of the chine and extends below the waterline. In one embodiment, each fin is approximately equal to the size of the recess forming the vent. The fins counterbalance the removal of a portion of the chine to vent the bottom and increase stability during turns.

The hull preferably also includes a pair of chine extensions, at least one chine extension projecting aft of the transom on each side for reducing or eliminating side-to-side oscillation of the stern when the hull is propelled through the water at slow speeds.

DESCRIPTION OF THE DRAWINGS

These, and other features, aspects and advantages of the present invention will become more fully apparent from the following detailed description, appended claims, and accompanying drawings where:

FIG. 7A is a partial stern perspective of a hull having an alternative embodiment of the chine extension, wherein the chine extension is an add-on having been attached to give similar effect as would one which has been integrally molded.

FIG. 7B is a cross-sectional view of a chine extension.

FIG. 7C is schematic view illustrating arched chine extensions affixed to a boat hull.

Figure 1:
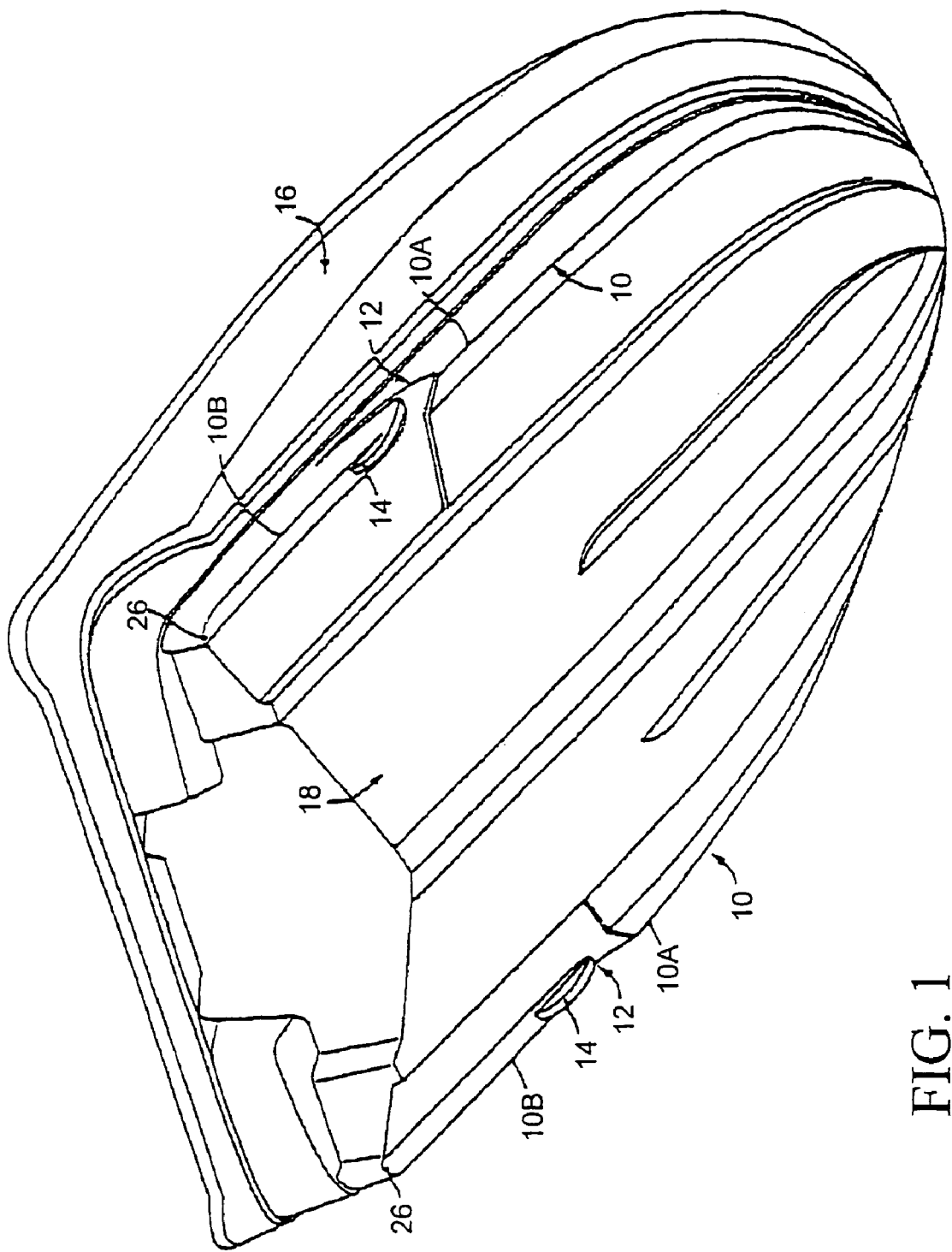
FIG. 1 is a stern perspective view of a vessel hull having a chine incorporating features of the invention.
Figure 2:
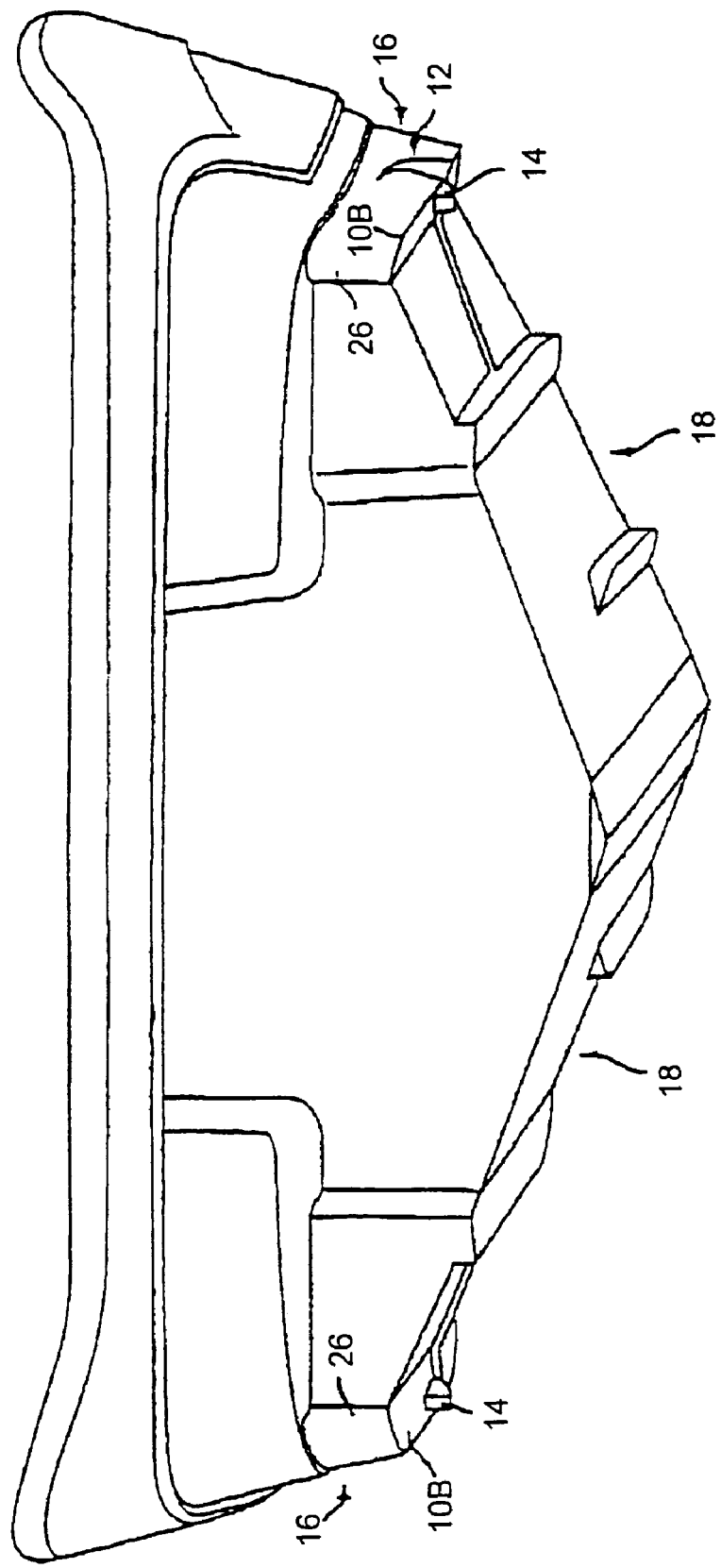
FIG. 2 is a stern view of the vessel hull.
Figure 3:
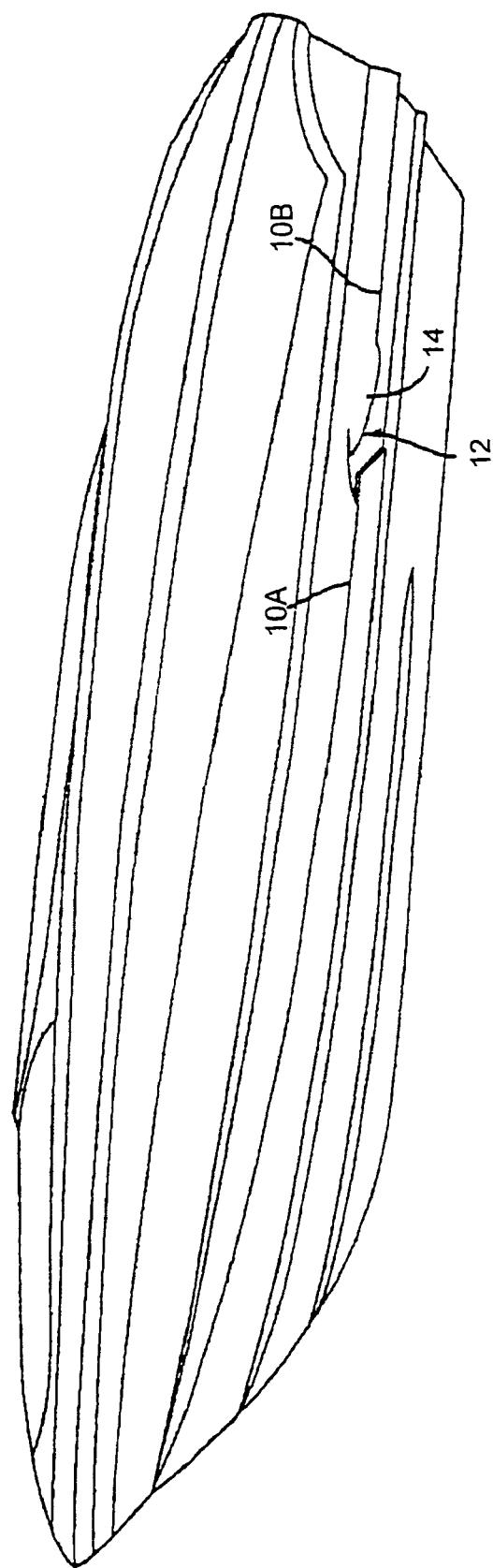
FIG. 3 is a side view of the vessel hull.

For simplicity and clarity of illustration, the drawings figures illustrate the general features of the invention. Description and details of well-known features and techniques are omitted to unnecessarily obscuring the invention.

DETAILED DESCRIPTION

The hull modifications described herein include an improved chine having design features that improve handling by increasing stability during turns and by decreasing stern wander at slow speeds. The hull modifications can be used with any type of vessel, for example, a boat, ship, or other watercraft, but are particularly adapted for use with a molded power boat hull.

Vented Chine with Stabilizing Fin

As illustrated in FIGS. 1–4, the hull includes a chine 10 having a vents 12 and stability fins 14. The hull has sides 16 and a bottom 18. Chine 10 is the portion of the hull forming the intersection between the sides 16 and bottom 18. In the illustrated embodiment, the chine 10 is a "hard" chine forming a well-defined edge. Alternatively, the hull can have a "soft" chine, defining a gentle curve with little or no definitive break between bottom and sides. A pair of vents 12 are formed in the chine 10 on each side to introduce air to the bottom 18. Each vent 12 can be formed by a recess or step which divides the chine into a forward portion 10A and an aft portion 10B.

A pair of downwardly extending fins 14 are positioned longitudinally (fore and aft), along the chine 10. In the illustrated embodiment, the fins 14 are integrally formed with a long aft chine 10B immediately aft of each vent 12. In another embodiment, the fins 14 are affixed in a secondary application. The fins can alternatively be formed in the forward chine 10A adjacent to and forward of each vent 12. In yet another embodiment, fins can be formed both fore and aft of each vent. Each fin 14 extends into the water a sufficient depth so as to increase the vertical surface area of the chine to counterbalance the removal of a portion of the chine to vent the bottom. The fins 14 can increase stability and reduce sideways skidding during turns by increasing the holding power of the chine 10.

Figure 4:
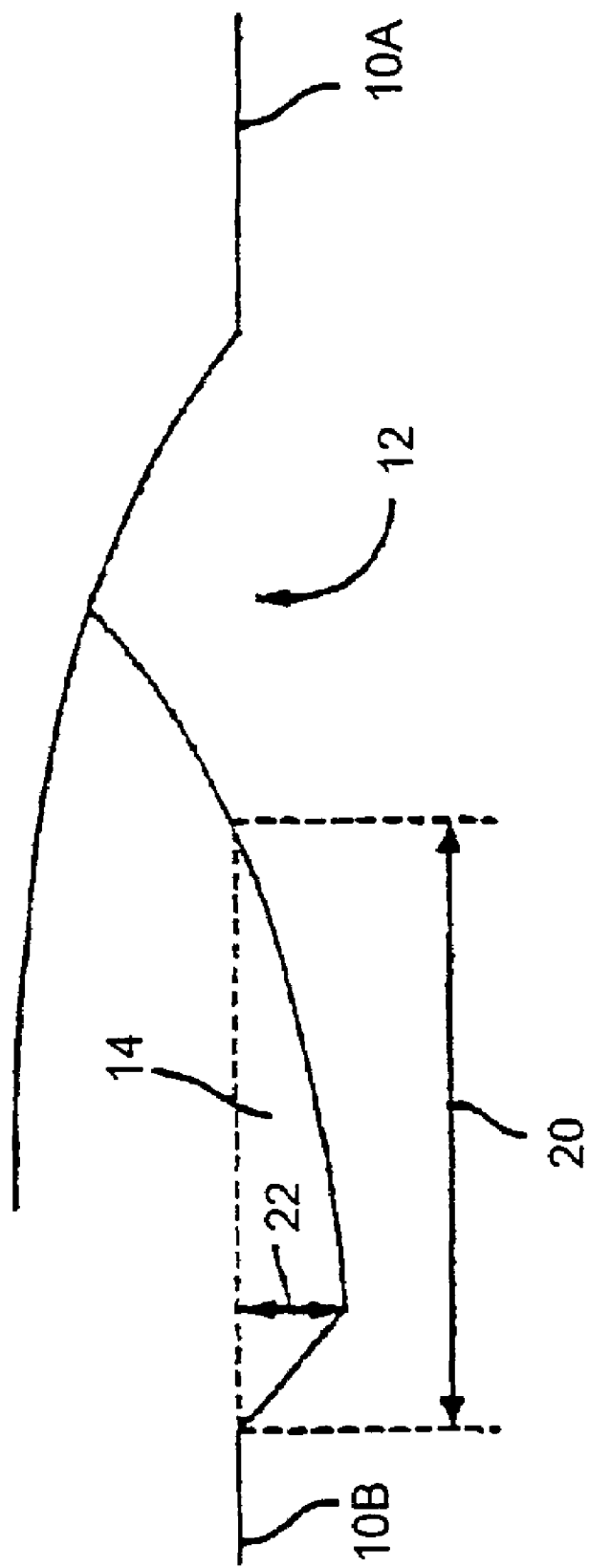
FIG. 4 is a side view of a vented chine with stabilizing fin.

FIG. 4 illustrates, by way of example, the approximate dimensions of a vented chine with stabilizing fin as implemented on a power boat hull having a bow to stern length of approximately 18–45 feet. In this embodiment, the vent 12 has a fore to aft length 20 of approximately 16–30 inches. The fin 14 has a vertical depth 22 from the plane of the horizontal chine of preferably approximately 1–2¼ inches, but can optionally be deeper. The surface area of each fin 14 is preferably approximately equal to the area of the recess so as to counterbalance the removal of the chine to form the vent. Each fin 14 is preferably approximately 1¼–1¾ inches thick, but may optionally be slightly narrower or optionally wider as deemed optimal by the skilled artisan depending on size and shape of the chine. The leading edge of the fin 14 preferably is relatively thin so as to minimize hydrodynamic drag as the vessel is propelled through the water in a forward direction.

Stern Chine Extensions

Figure 6:
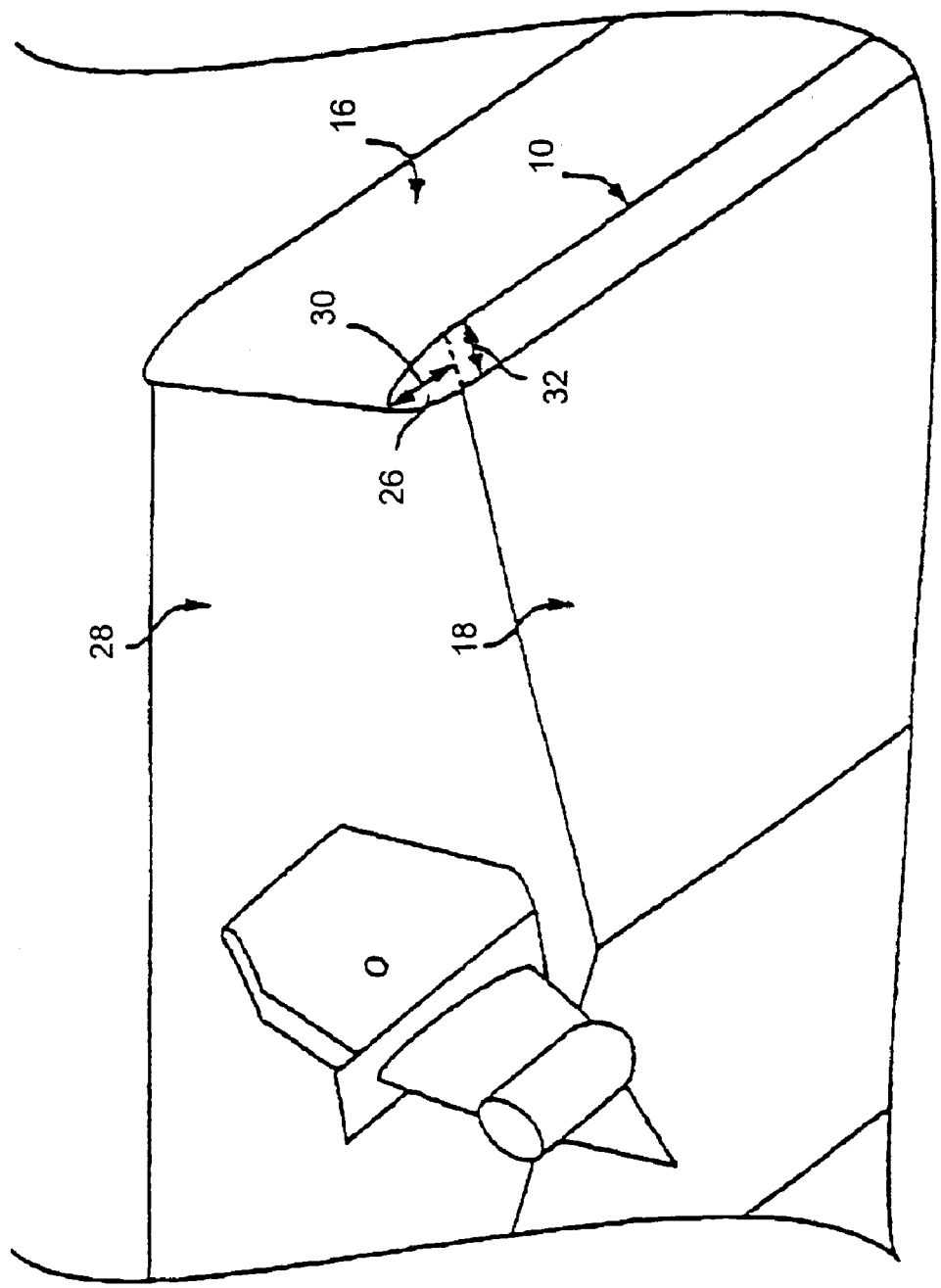
FIG. 6 is a partial stern perspective of a hull having a chine extension.

As best illustrated in FIGS. 6 and 7, a chine extension 26 projects aft of the transom 28 on each side to reduce or eliminate stern wander at slow speeds. The extensions 26 can be formed integrally with and form a portion of both the side 16 and bottom 18 of the vessel hull on each side of the transom 28.

Figure 5B:
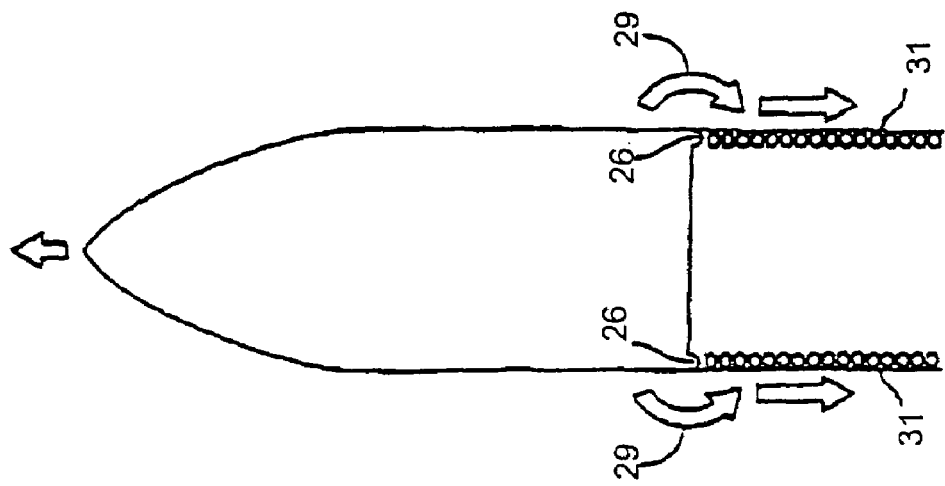
FIG. 5B is a schematic view illustrating hydrodynamic flow on a hull having chine extensions.
Figure 5A:
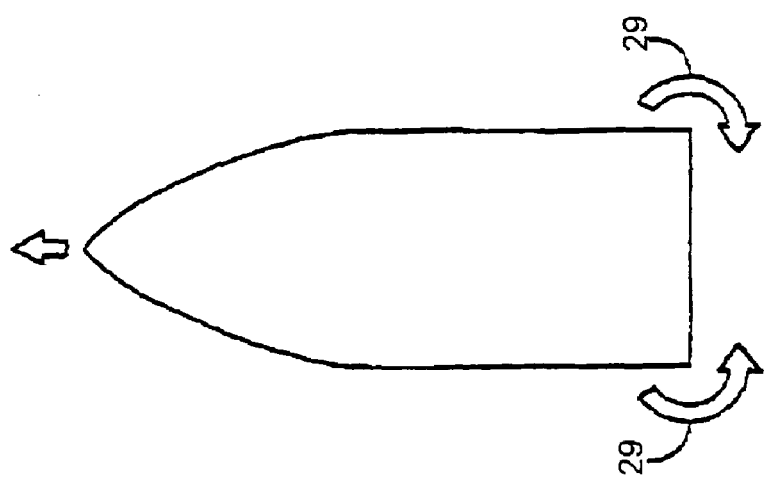
FIG. 5A is a schematic view illustrating hydrodynamic forces creating stern wander on a conventional hull.

As shown schematically in FIG. 5A, conventional transoms cause turbulence at the stern when the vessel is propelled at slow speeds as water 29 rushes around the sides to fill in the channel left by the boat. This turbulence pulls the stern of the boat into the vacuum in a haphazard manner or an oscillation. As illustrated in FIG. 5B, the chine extensions 26 create a vortex 31, or swirl at each corner of the stern. The water 29 rushing around the sides of the boat to fill in the channel is enveloped into the vortex 31. Rather than rushing by the vortex 31, the water 29 is added to the vortex 31 and is forced rearwardly away from the stern. This action controls the movement of water behind the boat to stabilize low speed stern wander.

FIG. 6 illustrates, by way of example, the approximate dimensions of a preferred embodiment of a chine extension as implemented on a power boat hull having a bow to stern length of approximately 10–40 feet. In this embodiment, the chine extension 26 has a fore to aft length of preferably approximately ⅞ to 1¾ inches. The width 32 of chine extension 26 is preferably approximately 3¼–4½ inches, but may vary as deemed optimal by the skilled artisan, depending on the size and shape of the chine. The horizontal cross-section of each extension 26 is preferably arched or semi-arched shape.

Figure 8:
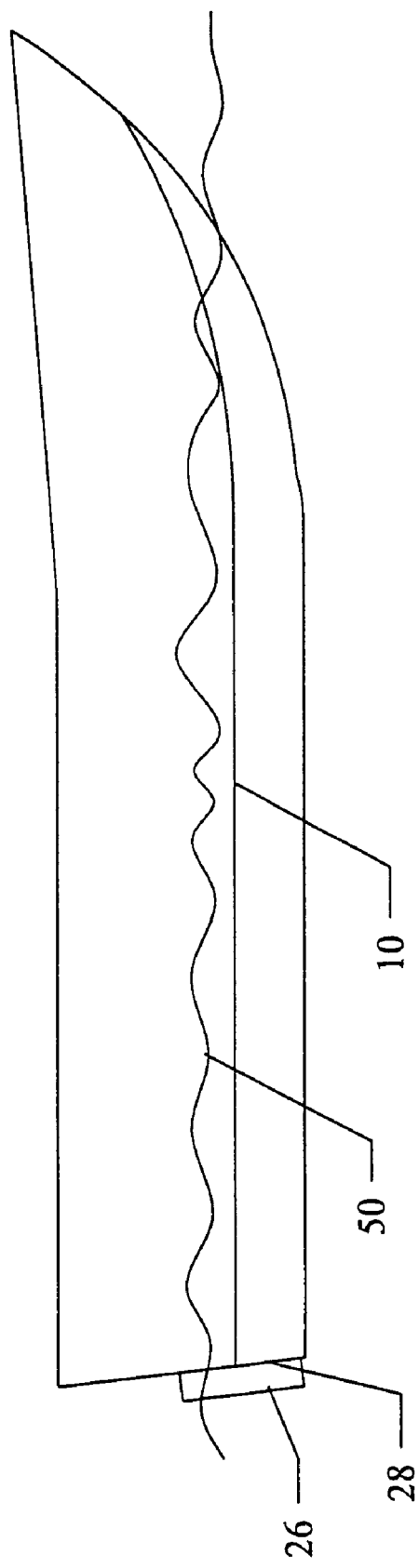
FIG. 8 is a side view illustrating that the chine extensions of the subject invention must simply be of sufficient height and position to interact with the waterline.

In an alternative embodiment, the chine extension may be manufactured separately, and attached to a vessel hull with a conventional transom. The dimensions of the separate chine extension can be similar to the "molded on" integral chine extension described above from the intersection of the transom to the end of the chine extension (see FIGS. 7A-7C) or any other shape so as to generate a vortex causing the water to act on the hull in a similar fashion as if the extension were integrally molded into the hull. Since many conventional transoms vary in height, the separately manufactured chine extension need only be tall enough to interact with the water at the floating waterline 50 of the vessel hull while underway (see FIG. 8).

Although the invention has been described with reference to specific embodiments, it will be understood by those skilled in the art that various changes may be made without departing from the spirit or scope of the invention. For instance, the numerous details set forth herein, for example, details relating to the shape and dimensions of the illustrated embodiments as implemented on power boat hulls, are provided by way of example to facilitate an understanding of the invention. Accordingly, the disclosure of embodiments of the invention is intended to be illustrative of the scope of the invention and is not intended to be limiting.

I claim:

1. In a boat hull, having a bow and a stem and at least one chine, the improvement comprising at least one chine having a recessed area disposed therein and at least one fin downwardly extending below said boat hull, wherein the recessed area longitudinally interrupts the chine, dividing the chine into one having a forward portion and an aft portion, wherein said fin is positioned longitudinally along said chine having said recessed area, wherein said fin is located adjacent to said recessed area, and wherein said fin is located immediately aft of said recessed area.

2. The boat hull, according to claim 1, comprising at least two fins, wherein a first fin is located fore of said recessed area and a second fin is located aft of said recessed area.

3. The boat bull, according to claim 1, wherein the surface area of said fin is approximately equal to the surface area missing from said chine as a result of said recessed area.

4. The boat bull, according to claim 1, wherein said fin extends downwardly for a vertical depth of about 1 inches to about 2¼ inches for a boat hull having a bow to stern length of about 18 feet to about 45 feet.

5. The boat hull, according to claim 1, wherein the port-to-starboard thickness of said fin is about 1¼ inches to about 1¾ inches for a boat hull having a bow to stern length of about 18 feet to about 45 feet.

6. The boat hull, according to claim 1, wherein the leading edge of said fin is thinner than the tailing edge.

7. The boat hull, according to claim 1, wherein said recessed area is a step.

8. The boat hull, according to claim 1, wherein said recessed area has a fore to aft length of about 16 to about 30 inches for a boat hull having a bow to stem length of about 18 feet to about 45 feet.

9. The boat hull, according to claim 1, wherein said chine having said recessed area further comprises an extension aft of said stem, wherein said extension comprises a longitudinal member projecting rearward from said stem.

10. The boat hull, according to claim 9, wherein said extension is integrally molded into said boat hull.

11. The boat hull, according to claim 9, wherein said extension is affixed to said boat hull.

12. The boat hull, according to claim 9, wherein said extension is arched along the horizontal, wherein the widest point of said arch is located adjacent to said boat hull.

13. The boat hull, according to claim 9, wherein said extension is semi-arched along the horizontal, wherein the widest point of said arch is adjacent to said boat hull.

14. The boat hull, according to claim 9, wherein said extension has a fore to alt length of about 7/8 inches to about 1 3/4 inches for a boat hull having a bow to stern length of about 10 feet to about 40 feet.

15. The boat hull, according to claim 9, wherein the port-to-starboard width of said extension at the point closest to said boat hull is about 3 1/4 inches to about 4 1/2 inches for a boat hull having a bow to stern length of about 10 feet to about 40 feet.

* * * * *